United States Patent
Nikain et al.

(10) Patent No.: US 11,539,815 B2
(45) Date of Patent: *Dec. 27, 2022

(54) ENHANCED SELF-ASSEMBLING AND SELF-CONFIGURING MICROSERVICES

(71) Applicant: AT&T Intellectual Property I, L.P., Atlanta, GA (US)

(72) Inventors: Mohammad Nikain, Atlanta, GA (US); Jiyuan Wang, Cumming, GA (US); Abdelmajid Belhareth, Lawrenceville, GA (US); Daniel Connolly, Suwanee, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,745

(22) Filed: Jul. 15, 2021

(65) Prior Publication Data

US 2021/0344777 A1 Nov. 4, 2021

Related U.S. Application Data

(63) Continuation of application No. 16/709,735, filed on Dec. 10, 2019, now Pat. No. 11,146,658, which is a
(Continued)

(51) Int. Cl.
*G06F 15/16* (2006.01)
*H04L 67/63* (2022.01)
(Continued)

(52) U.S. Cl.
CPC ............ *H04L 67/63* (2022.05); *G06F 9/5077* (2013.01); *H04L 41/082* (2013.01);
(Continued)

(58) Field of Classification Search
CPC ....... H04L 67/327; H04L 67/16; H04L 67/34; H04L 67/1004; H04L 41/0806; H04L 41/082; G06F 9/5077
See application file for complete search history.

(56) References Cited

U.S. PATENT DOCUMENTS 8,181,153 B2 * 5/2012 Grechanik ................ G06F 8/72
717/111
2002/0147771 A1 10/2002 Traversat et al.
(Continued)

*Primary Examiner* — Padma Mundur
(74) *Attorney, Agent, or Firm* — Guntin & Gust, PLC; Matthew Tropper

(57) ABSTRACT

A method for managing systems with interrelated microservices with self-assembling and self-configuring microservices includes receiving at a first micro service a service request from a client. A determination is the made whether the first micro service is capable of processing the service request. If the first micro service is capable of processing the service requests, then processing the service request; if the first micro service cannot process the service request then routing the service request to a first stem service. The first stem service determines whether there is a second micro service that can process the service request. If the second micro service that can process the service requests exists, then forwarding the service request to the second micro service for processing. If there is no second micro service that can service the service requests then morphing the first stem service into a micro service that can service the service request.

20 Claims, 10 Drawing Sheets

Related U.S. Application Data continuation-in-part of application No. 16/526,160, filed on Jul. 30, 2019, now Pat. No. 11,165,627.

(51) Int. Cl.
  *H04L 67/00* (2022.01)
  *H04L 67/1004* (2022.01)
  *H04L 41/0806* (2022.01)
  *G06F 9/50* (2006.01)
  *H04L 41/082* (2022.01)
  *H04L 67/51* (2022.01)

(52) U.S. Cl.
  CPC ...... *H04L 41/0806* (2013.01); *H04L 67/1004* (2013.01); *H04L 67/34* (2013.01); *H04L 67/51* (2022.05)

(56) References Cited

U.S. PATENT DOCUMENTS

| | | |
|---|---|---|
| 2016/0124742 A1 | 5/2016 | Rangasamy et al. |
| 2017/0374180 A1* | 12/2017 | Gowda .................. H04L 67/02 |
| 2018/0121221 A1 | 5/2018 | Ahuja et al. |
| 2018/0307524 A1 | 10/2018 | Vyas et al. |
| 2019/0340088 A1 | 11/2019 | Sanakkayala et al. |
| 2020/0133744 A1 | 4/2020 | MacLeod et al. |
| 2020/0133795 A1 | 4/2020 | Rhodes et al. |
| 2020/0195526 A1 | 6/2020 | Eberlein et al. |
| 2020/0249994 A1 | 8/2020 | Hrivnak et al. |

* cited by examiner

ENHANCED SELF-ASSEMBLING AND SELF-CONFIGURING MICROSERVICES

CROSS-REFERENCE TO RELATED APPLICATIONS

This application is a continuation of U.S. Utility application Ser. No. 16/709,735 titled ENHANCED SELF-ASSEMBLING AND SELF-CONFIGURING MICOSERVICES, filed on Dec. 10, 2019, now U.S. Pat. No. 11,146,658 issued on Oct. 12, 2021, which is a continuation-in-part of U.S. Utility application Ser. No. 16/526,160 titled SELF-ASSEMBLING AND SELF-CONFIGURING MICROSERVICES, filed on Jul. 30, 2019, in which the aforementioned applications are incorporated herein by reference in their entirety for any and all purposes.

TECHNICAL FIELD

The present disclosure relates to the management of systems with interrelated services. More particularly, the disclosure relates to a method, system, and computer program for managing systems with interrelated microservices with self-assembling and self-configuring microservices.

BACKGROUND

Replacement of large, multi-feature, operations support systems (OSS systems) (e.g. Inventory management, fault management, etc.) with smaller, more focused, systems (microservices) effectively replaces each large OSS with (on average) N microservices. Since the OSS are mostly interconnected, the number of interconnections among the microservices is larger by order of N-squared.

The traditional methods in managing an OSS infrastructure involve planning the OSS functionality and interconnections (i.e. interface agreements), by a central team of architects/engineers. After each OSS module is ready, each of its interfaces is "integration tested" with other systems (typically called end-to-end test) and is then put into production.

Communication service providers (CSPs) are transitioning to OSS architectures based on microservices. Microservices are an architectural and organizational approach to software development where software is composed of small independent services, deployed in a host (physical or virtual machine), that communicate over well-defined application programming interfaces (APIs). These services are owned by small, self-contained teams. Microservices are autonomous. Each component service in a microservices architecture can be developed, deployed, operated, and scaled without affecting the functioning of other services. Services do not need to share any of their code or implementation with other services. Any communication between individual components happens via well-defined APIs. Microservices are specialized. Each service is designed for a set of capabilities and focuses on solving a specific problem. If developers contribute more code to a service over time and the service becomes complex, it can be broken into smaller services.

The microservice architecture provides agility. Microservices foster an organization of small, independent teams that take ownership of their services. Teams act within a small and well understood context and are empowered to work more independently and more quickly. This shortens development cycle times.

Microservices provide flexible scaling. Microservices allow each service to be independently scaled to meet demand for the application feature it supports. This enables teams to right-size infrastructure needs, accurately measure the cost of a feature, and maintain availability if a service experiences a spike in demand. Microservices provide for easy deployment. Microservices enable continuous integration and continuous delivery, making it easy to try out new ideas and to roll back if something doesn't work. The low cost of failure enables experimentation, makes it easier to update code, and accelerates time-to-market for new features. Microservices architectures do not follow a "one size fits all" approach. Teams have the freedom to choose the best tool to solve their specific problems. As a consequence, teams building microservices can choose the best tool for each job. Dividing software into compact modules enables programmers to reuse the code for multiple purposes. A service written for a certain function can be used as a template for another feature. Unlike a monolithic architecture, where the failure of a single component can cause the whole application to fail, microservices failure result in the degradation of functionality and not the crash of the application.

In a microservices environment, the "architect" team has to consider N-times more components (evolving on different schedules) and N-Squared a greater number of interfaces which, due to their numbers, can easily fall out of sync (in terms of compatibility). The end result introduces a number of problems. One problem is that revisions get out of sync (one microservice upgrades and breaks other microservices downstream, e.g. its clients). Another problem is that load balancing becomes a major issue as it is difficult to foresee how microservices put loads on other microservices, resulting in slow performance and crashes. Yet another problem occurs when microservices functionality overlaps with other microservices or gaps are introduced into the infrastructure which are not covered by any microservices. With the use of microservices troubleshooting becomes very difficult since it is not easily understood whether the problem is with one microservice, its downstream services, or a design flaw. These issues hinder the migration to microservices, cause the microservices-based OSS infrastructure to not function properly, or both, which in either case can result in significant operations cost along with loss of productivity and savings opportunities.

SUMMARY

One general aspect includes a method that includes the step of receiving at a first micro service in a plurality of micro-services disposed in a system, a service request from a client. The method the determines whether the first micro service is capable of processing the service request; and if the first micro service is capable of processing the service requests, then processing the service request. If the first micro service cannot process the service request then the service request is routed to a first stem service. The first stem service determines whether there is a second micro service that can process the service request. If the second micro service can process the service requests, then forwarding the service request to the second micro service. If there is no second micro service that can service the service requests then morphing the first stem service into a micro service that can service the service request.

Implementations may include one or more of the following features. The method further including establishing a minimum number of stem services to be active in the system. The method further including determining a number of stem services active in the system. The method further including determining if the number of stem services active in the system is less than the minimum number of stem services to be active in the system. The method further including spinning up a stem service if the number of stem services active in the system is less than the minimum number of stem services to be active in the system. The method where the plurality of micro-services in the first stem service each include a client routing component, a micro service directory component and a process instantiation and control component. The method where the step of morphing the first stem service into a micro service that can service the service request includes loading rules stored in the first stem service.

One general aspect includes a system including: a plurality of micro-services and stem services stored in the system and a memory for storing computer instructions. The system further includes a host computer coupled with the memory, where the host computer, responsive to executing the computer instructions, performs certain operations. The operations include receiving at a first micro service a service request from a client. The operations also include determining whether the first micro service is capable of processing the service request. The operations also include if the first micro service is capable of processing the service requests, then processing the service request and if the first micro service cannot process the service request then routing the service request to a first stem service. The operations also include determining at the first stem service whether there exists a second micro service from the plurality of micro-services that can process the service request. If there is a second micro service that can process the service requests, then forwarding the service request to the second micro service. The operations also include if there is no second micro service that can service the service requests then morphing the first stem service into a micro service that can service the service request.

Implementations may include one or more of the following features. The system where the host computer, responsive to executing the computer instructions performs operations further including establishing a minimum number of stem services to be active in the system. The system where the host computer, responsive to executing the computer instructions performs operations further including determining a number of stem services active in the system. The system where the host computer, responsive to executing the computer instructions performs operations further including determining if the number of stem services active in the system is less than the minimum number of stem services to be active in the system. The system where the host computer, responsive to executing the computer instructions performs operations further including spinning up a stem service if the number of stem services active in the system is less than the minimum number of stem services to be active in the system. The system where the plurality of micro-services in the first stem service each include a client routing component, a micro service directory component and a process instantiation and control component. The system where the host computer, responsive to executing the computer instructions performs operations further including morphing the first stem service into a micro service that can service the service request by loading rules stored in the first stem service.

One general aspect includes a non-transitory, tangible computer-readable medium having computer-executable instructions stored thereon which, when executed by a computer, cause the computer to perform a method including receiving at a first micro service in disposed in a system, a service request from a client. Then determining whether the first micro service is capable of processing the service request. If the first micro service is capable of processing the service requests, then processing the service request. If the first micro service cannot process the service request then routing the service request to a first stem service. Determining at the first stem service whether there exists a second micro service from the plurality of micro-services that can process the service request. If the second micro service that can process the service requests exists, then forwarding the service request to the second micro service; and if there is no second micro service that can service the service requests then morphing the first stem service into a micro service that can service the service request.

Implementations may include one or more of the following features. The non-transitory, tangible computer-readable medium where the computer-executable instructions which, when executed by a computer, cause the computer to perform a method further including establishing a minimum number of stem services to be active in the system. The non-transitory, tangible computer-readable medium where the computer-executable instructions which, when executed by a computer, cause the computer to perform a method further including determining a number of stem services active in the system. The non-transitory, tangible computer-readable medium where the computer-executable instructions which, when executed by a computer, cause the computer to perform a method further including determining if the number of stem services active in the system is less than the minimum number of stem services to be active in the system. The non-transitory, tangible computer-readable medium where the computer-executable instructions which, when executed by a computer, cause the computer to perform a method further including spinning up a stem service if the number of stem services active in the system is less than the minimum number of stem services to be active in the system. The non-transitory, tangible computer-readable medium where the computer-executable instructions which, when executed by a computer, cause the computer to perform a method where the step of morphing the first stem service into a micro service that can service the service request includes loading rules stored in the first stem service.

DETAILED DESCRIPTION OF ILLUSTRATIVE EMBODIMENTS

Glossary

Figure 1:
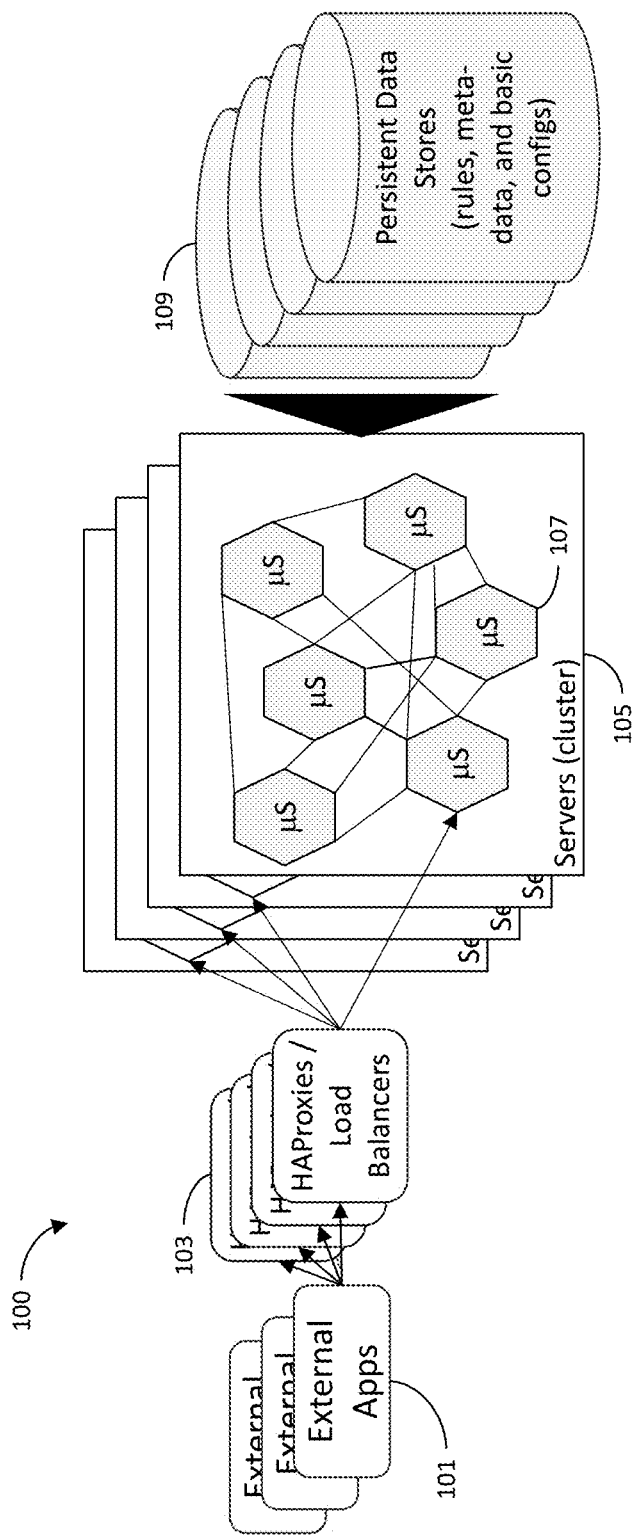
FIG. 1 is a block diagram of a system architecture 100 for self-managed microservices.

Algorithm. a process or set of rules to be followed in calculations or other problem-solving operations, API. a set of functions and procedures allowing the creation of applications that access the features or data of an operating system, application, or other service.

Base code. (e.g., boiler plate code, infrastructure code, etc.)

Colony of Microservices.

Container. A container is a standard unit of software that packages up code and all its dependencies so the application runs quickly and reliably from one computing environment to another.

Directory Service. Service that tracks location of microservices.

Docker is a platform and tool for building, distributing, and running Docker containers.

Docker Containers. Docker containers are Containers that run on Docker Engine. Docker containers are standard and portable. They are lightweight because they share the machine's operating system kernel and therefore do not require an operating system for application. Docker containers are also secure.

HAProxies. HAProxies provides high availability load balancer and proxy server for TCP and HTTP-based applications that spreads requests across multiple servers. It is written in C and has a reputation for being fast and efficient (in terms of processor and memory usage).

Host resource service. Service that starts a new microservice when needed.

HTTP 301/302 code. A 301 redirect means that an address has permanently moved to a new location. A 302 redirect means that the move is only temporary.

Infrastructure Services. Directory service and Host resources services.

"Kubernetes" are container orchestration systems for Docker containers that are meant to coordinate clusters of nodes at scale in production in an efficient manner.

"Leader election." Leader election is the process of designating a single process as the organizer of some task distributed among several computers (nodes). Before the task is begun, all network nodes are either unaware which node will serve as the "leader" (or coordinator) of the task, or unable to communicate with the current coordinator. After a leader election algorithm has been run, however, each node throughout the network recognizes a particular, unique node as the task leader.

"Load Balancing." Load balancing is the process of distributing network traffic across multiple servers. This ensures no single server bears too much demand. By spreading the work evenly, load balancing improves application responsiveness. It also increases availability of applications and websites for users.

Microservices. A microservice is an architectural design that separates portions of a (usually monolithic) application into small, self-containing services. The key idea in microservice architecture is to create small (really small) services, develop and deploy them independently. Each microservice uses its own database and could be written in any programming language. In short, the microservice architectural style is an approach to developing a single application as a suite of small services, each running in its own process and communicating with lightweight mechanisms, often an HTTP resource API. These services are built around business capabilities and independently deployable by fully automated deployment machinery. There is a bare minimum of centralized management of these services, which may be written in different programming languages and use different data storage technologies.

Microservices are built around business capabilities, communicating through lightweight interfaces (REST JSON style requests, in general there is no need for an Enterprise Service Bus or complex XML SOAP envelopes), and having a decentralized control of data where each service manages its own data.

Morphing. The act of a stem service being expressed as a specific microservice. The morphing (or "expression" in biological terms) is accomplished by the stem-service loading rules of the new microservice (the system is primarily rule-based, so loading new rules change the behavior of the service).

"Microservice Proxy". Microservice Proxy is a microservice that know how to load, shutdown, and route to the non-compliant microservice; so, in the case of a stem-service morphing (expressing) into a non-compliant microservice, it will just load the proxy's rules and those rules will instantiate the non-compliant microservice and route traffic to it.

Network protocols. are sets of established rules that dictate how to format, transmit and receive data so computer network devices—from servers and routers to endpoints—can communicate regardless of the differences in their underlying infrastructures, designs or standards.

Non-Compliant Services. Services that do not follow the rules of the regular self-assembling/self-configuring microservice.

Proxy. In computer networks, a proxy acts as an intermediary for requests from clients to servers for resources. An outbound proxy provides both security isolation and performance optimization for network traffic. Internal clients protected by a firewall do not have direct access out to the Internet. Instead, clients send all requests to a proxy that does have external access that then makes the requests on behalf of the original client. The proxy can optionally cache content locally optimizing the use of network bandwidth and providing faster responses to clients.

Pseudo-random number generator. A pseudorandom number generator (PRNG), also known as a deterministic random bit generator (DRBG),[1] is an algorithm for generating a sequence of numbers whose properties approximate the properties of sequences of random numbers. The PRNG-generated sequence is not truly random, because it is completely determined by an initial value, called the PRNG's seed (which may include truly random values). Although sequences that are closer to truly random can be generated using hardware random number generators, pseudorandom number generators are important in practice for their speed in number generation and their reproducibility.

Pseudo Random Routing. As used herein pseudo-random routing means that the incoming gateway tries to route the request properly, but if it doesn't and routes it to the wrong microservice, the (wrong) microservice will still take the request and route it to its proper destination. In some cases, the gateway might know about some destinations (based on caching) and will route the requests to them directly, but if it doesn't know the destination, then it will pick a random microservice and will route the request to it and let the microservice handle it. In the latter case, a pseudo-random number generator is used to identify the target microservice so as to avoid sending all the unknowns to one instance (in this case it will be the port number that is randomly generated, plus potentially an index of a host in a list of available hosts).

Rule Engine. A rule engine, which is a set of tools that enable business analysts and developers to build decision logic based on an organization's data. The rule engine applies rules and actions as defined by end users without affecting how the application runs.

"Service." A service is a self-contained unit of software that performs a specific task.

"Service Protocols." Service protocols deal with identifying which service is needed to display the contents of each packet.

"Spin up." Spin up means to create an instance (of say a microservice).

"Stem Services." Stem Services are microservices that can morph into any other microservice (i.e. behave similar to a stem cell in a biological analogy).

Virtual Directory Services. A virtual entity realized through a distributed protocol to exchange directory services among each microservice (i.e. so each has view of the entire directory).

Illustrated in FIG.1 is a block diagram of a system architecture 100 for self-managed microservices. The system architecture 100 includes a plurality of external applications 101 that access a plurality of HAP proxies/load balancers 103 which in turn access a plurality of servers 105 each having a plurality of microservices 107 (each referred to as a µS in the drawings). The plurality of micro services 107 in a server is referred to as a colony. In one embodiment the microservices 107 may access persistent data stores 109 which may store rules, metadata, and basic configurations.

Figure 2:
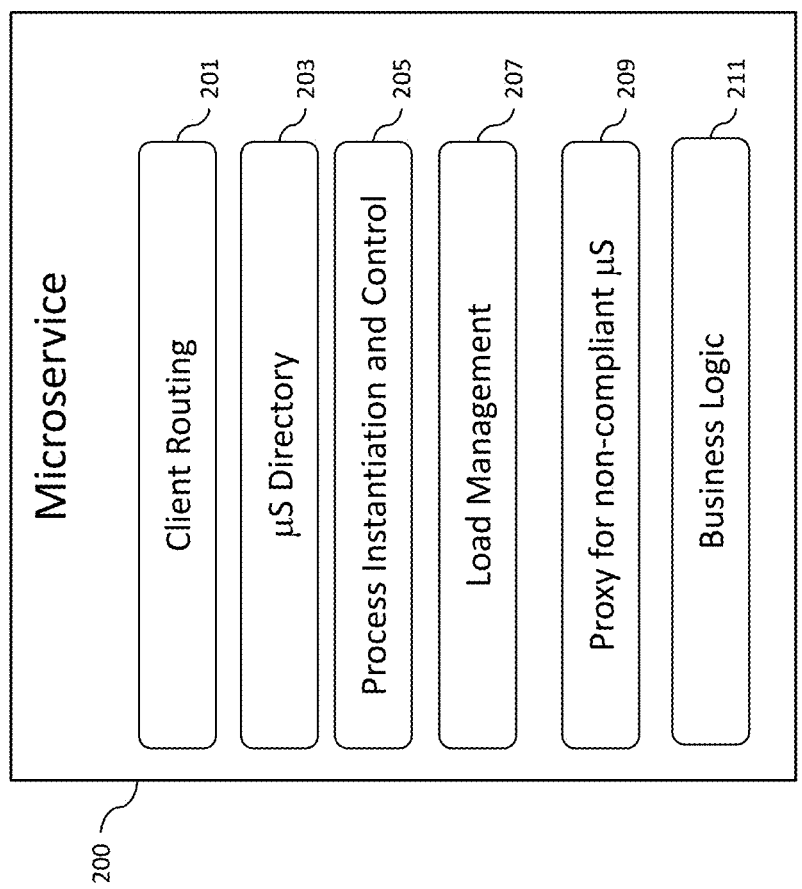
FIG. 2 is an illustration of the components of a self-managed microservice.

Self-managed microservices are provided through a microservice 200, illustrated in FIG. 2 comprising a client routing component 201, a microservice directory component 203, a process instantiation and control component 205, a load management component 207, a proxy component for noncompliant microservices 209 and a business logic component 211. The micro service 200 runs in a docker container.

The client routing component 201 provides requests proxy and client redirect capabilities to the microservice 200. The client routing component 201 acts as a proxy for the clients in the event that the client request needs to be redirected to another microservice. This component is a part of each compliant microservice 200. If the microservice receives a request that is not served by that microservice, the request is routed to a stem service. This routing is handled by sending the client an HTTP redirect response (e.g. HTTP 301 or HTTP 302) to the client with the URL of the stem service, or by proxying the request (e.g. such as in an HTTP proxy), or other mechanism to ensure client's requests are routed to the stem service.

The microservice directory component 203 provides a directory exchange protocol and stores directory information about all microservices operating in the servers 105. The directory contains a set of records each having a destination microservice's name, destination information (e.g. URL), service type, timestamp, add/delete flag, load indicator and a verified/unverified flag. The add/delete flag is used to know whether a record is added or deleted. The verified/unverified flag determines whether a microservice has direct knowledge of the destination microservice which means either the destination is the microservice itself (each microservice has itself in its directory also), or that the microservice has directly attempted to contact the destination microservice. If a direct contact succeeds, then an "add" record is added; if a direct contact fails, then a "delete" record is added. (both are considered "verified"). Once there is any change in records, a notification is sent to all microservices in the directory about the change (directory update). If a directory update is received by microservice A, then the microservice A's directory records are updated with the incoming records with the following notes:

1. If an existing record is "verified" and the corresponding incoming record is "unverified" the incoming record is ignored.
2. If both incoming and existing records are 'verified,' then the one with the most recent timestamp wins.
3. If there is only one 'add' or 'delete' record per destination microservice; the most recent timestamp wins with the above two exceptions (i.e. unverified records do not replace verified records).

Each microservice can receive a directory request an issue in response to a directory request. The micro services randomly communicate with each other and microservice with a directory can provide the directory (list of hosts and ports) to other microservices. In an embodiment the microservice directory component 203 may include a database including the addresses of all microservices in the colony. In operation, the micro service directory component 203 in a micro service A may send a communication to a micro service B. if the micro service A does not receive a response, it senses that microservice B is dead and updates the record in the directory. The updated record is then communicated to all micro services in the colony thus ensuring the reliability of the directory among the micro services in the colony.

The process instantiation and control component 205 provides the capability of stem service and morphing based on the rules/meta-data-driven arrangement. This is done by the stem process loading the metadata (e.g. rules and/or configuration information) for the target process. Since these processes are meta-data driven, once you load the new meta-data (rules and configs) the process will behave like the target process. Note that you can also load specific code for the target microservice and let it attach to (i.e. takeover) the current URL. This way, the next request will be serviced by the "logic" that is loaded into the microservice (either the metadata or the new code that is attached to the URL).

The load management component 207 provides load exchange protocols and self-destruct dissemination protocol to enable leader's selection process for controlling the number of stem services active in the system. The directory service will include a "load indicators" that shows a process's performance measure. These are one or more indicators showing the performance of the microservice as compared to specifications. (e.g. throughput is 50% of specs, etc.).

1. The load management component 207 ensures that when a microservice is finding a target (either routing a client request or itself trying to connect to another service), the microservice considers the load indicator value and if it determines that the performance is too low, the microservice will route the request to a stem service to instantiate a new destination instance. Note that the stem service is also running the same component so it will make the same determination and morph into that target as opposed to routing the request to it. Also, note that during this transfer, the target's performance might improve, and if so, the stem service with just route the request into it as opposed to starting another copy.
2. If a microservice finds itself idling (i.e. its load indicators are too low, showing very low utilization), then it will enter a leader selection algorithm with all other copies of itself which are also in low utilization. And once a leader is selected, the leader will shut itself down allowing the remaining copies to handle the load. The leader selection algorithm can be one of many that exist that elects a single microservice among the set and ensures each microservice agrees to the single leader.

The proxy component for noncompliant microservices 209 provides proxy routing and docker/Kubernetes drivers. There are several ways to do this. In all methods, a "proxy"

microservice (A) will have all the standard components (directory service, load management, etc.) plus the ability to start and stop the actual microservice being proxied (B). Also, when A starts B, it must know how to route requests to and from B. Depending on the architecture of B, A can proxy requests to and from B (i.e. client sends to A, A sends to B, B responds to A, and A relays to the client) or can redirect client requests to B (using, for example, HTTP redirects such as HTTP 301 and HTTP 302. A may also monitor B's logs and provide performance information (e.g. load indicators), etc. based on this information. Depending on abilities of B, some of the functions may be limited (e.g. if B does not report its load numbers, then A cannot report accurate load numbers and the load balancing of B will be limited).

The core of a microservice is its business logic that implements the business rules. The business logic component 211 provides implementation of the business objects, rules and policies. For example, a simple microservice may receive a request for data, get the data, verify a zip code and send the response.

The present disclosure introduces several concepts to eliminate two infrastructure services that were disclosed in U.S. application Ser. No. 16/516,160. The infrastructure services are the directory service, which would track location of microservices; and the host resources services, which would start new microservices as they were needed. The present disclosure replaces the infrastructure services by introducing a "stem-service" which is essentially the 'stem cell' version of a microservice. This 'stem-service' can morph into any microservice and also has the ability to start other microservices.

In an embodiment the directory service is now a virtual directory service. The directory is a virtual entity realized through a plurality of microservice directory components 203 and a distributed protocol to exchange directory services among each microservice (i.e. so each has view of the entire directory). This is accomplished by each microservice 200 broadcasting any changes it "directly senses" in the collection of microservices (colony) to others. These changes include when a microservice morphs into another microservice, when one starts up, when one ceases to function or respond (dies). This is actually sent by another microservice whose request to the "dead" microservice fails, and hence learns of the "death"). The microservice directory component 203 sends only "directly sensed" changes to other microservices to avoid catastrophic flood of exchanges (relayed back and forth among nodes). The host resources microservice is replaced by two features (special stem services and the ability of each microservice to spin up a stem service) along with leveraging the enhanced load balancing and routing features.

Special stem-services, are microservices that can morph (convert) into any other microservice (i.e. behave similar to a stem cell). The morphing (or "expression" in biological terms) is accomplished by the stem service loading rules of the new microservice (the system is primarily rule-based, so loading new rules change the behavior of the service). For example, stem service A may morph into stem service B as follows. Initially stem service A is bound to a port (for example, it is sitting at a URL http://www.ms.com:8080/svcA

EXAMPLE 1

1. stem service A detaches from the port (now 8080 is free on this host)
2. stem service A starts stem service B and gives him port 8080 to use
3. stem service B is started and is now listening on http://www.ms.com:8080/svcB
4. stem service A shuts itself down

EXAMPLE 2

If process A can load new metadata in real-time, it will just dump its metadata (rules) and loads the new metadata (rules). Once these new rules/metadata are loaded, it will start responding to http://www.ms.com:8080/svcB instead of http://www.ms.com:8080/svcA.

In an embodiment, the rules for all micro services in the colony may be stored in each micro service so that every micro service will have all of the rules for the other micro services. In an alternate embodiment each micro service may have access to the rules stored in a central database.

In an embodiment, the system may support services which are non-compliant (i.e. do not follow the rules of the regular self-assembling/self-configuring microservice) through having an microservice be a proxy for these services. The proxy is a micro service that is compliant and whose job is to direct request to and from noncompliant micro services. The proxies know how to load, shutdown, and route to the non-compliant microservice; so, in the case of a stem-service morphing (expressing) into a non-compliant microservice, it will just load the proxy's rules and those rules will instantiate the non-compliant microservice and route traffic to it.

Once a stem-service is morphed (expressed into a specific microservice), the newly "born" microservice will advertise itself as usual and the distributed directory service (i.e. all other microservices) will know of its creation.

The second feature to replace the host services is ability of all microservices to startup a stem-service and then morph/express into the needed microservice. Starting up just one service type is simple enough that it is practical for all microservices to do it (a simple routine available in each microservice base code). The trigger to start a stem-service is described below.

There is no change to a microservice shutting itself down due to excessive number. This may be accomplished by leader selection and then the leader terminating itself). Leader election coordinate the actions performed by a collection of collaborating microservices by electing one microservice as the leader that assumes responsibility for managing the others. This can help to ensure that microservices do not conflict with each other, cause contention for shared resources, or inadvertently interfere with the work that other microservices are performing. The startup process is simplified in that rather than starting up the needed microservice, microservices only spin up stem-services regardless of what is needed. Then the stem-service will morph into any needed microservice.

This "morphing" on demand is handled according to a set of protocols specified below. The morphing on demand process only requires sufficient stem-services to be available so they can morph as needed; therefore, the microservices are configured to require a minimum set of stem-services available; if this number is below a minimum in the distributed directory, then a stem-service is spun up. The minimum number of stem services are determined by the network operator based on performance parameters. Multiple microservices will detect this lack of sufficient stem-services, so the same leader selection process described above is used here so only one stem-service is spun up. The same process is repeated until the minimum number is running.

The morphing of a stem-service to a specific microservice is handled through a pseudo-random routing ability available in each microservice. This algorithm consists of two parts: a) If an microservice receives a request that doesn't belong to it, it will re-route the client (e.g. through HTTP 301/302 codes or RESTful routing) to an instance of a stem-service; and b) if a stem service receives a request, it will check the directory for that microservice, if it finds one, it will route the client to it; otherwise, it will morph into the microservice that will handle that request (the stem-services do not natively handle any request, so any request they receive is interpreted as a request that was destined to some other microservice).

FIGS. 3A-3G illustrate the operation of the microservices and the stem services.

Figure 3A:
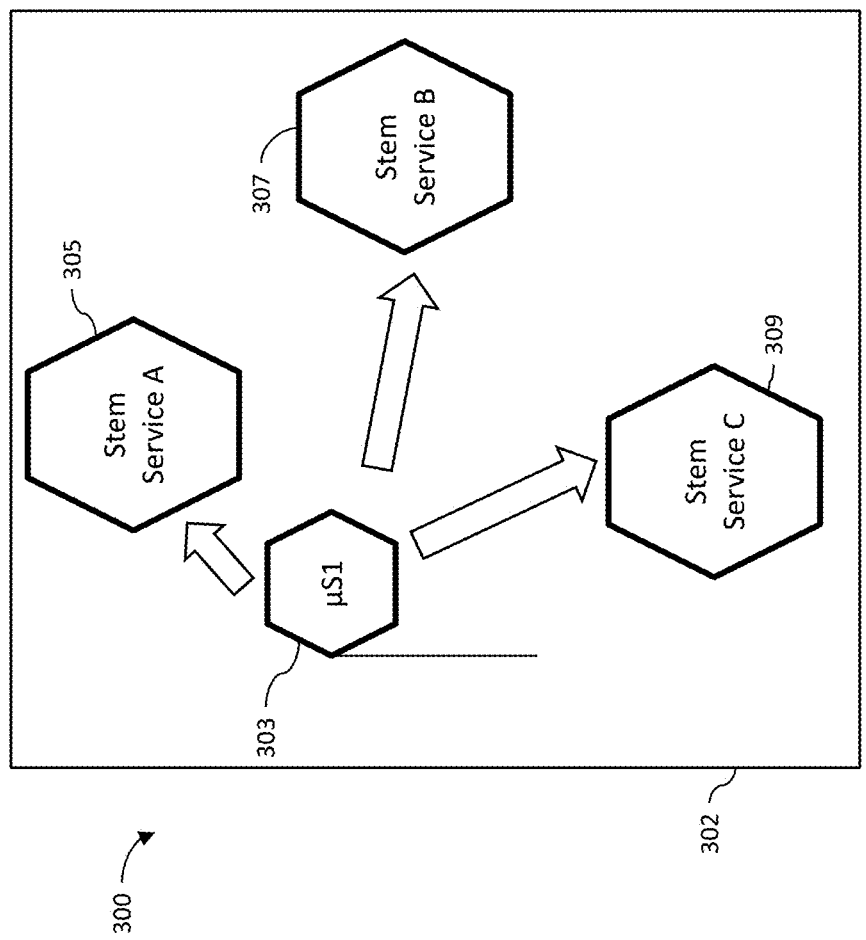
FIGS. 3A-3G are block diagrams illustrating the operation of self-managed microservices and stem services.

In FIG. 3A, an initial microservice μS1 303 is spun up in server 302. Upon being spun up, μS1 303 determines if there are a minimum number of stem services. If there are not a minimum number of stem services μS1 303 will spin up a stem service (Stem A 305). The microservice will again determine if there are a minimum number of micro services, and if not, it will spin up additional Stem services (Stem Service B 307 and Stem service C 309).

Figure 3B:
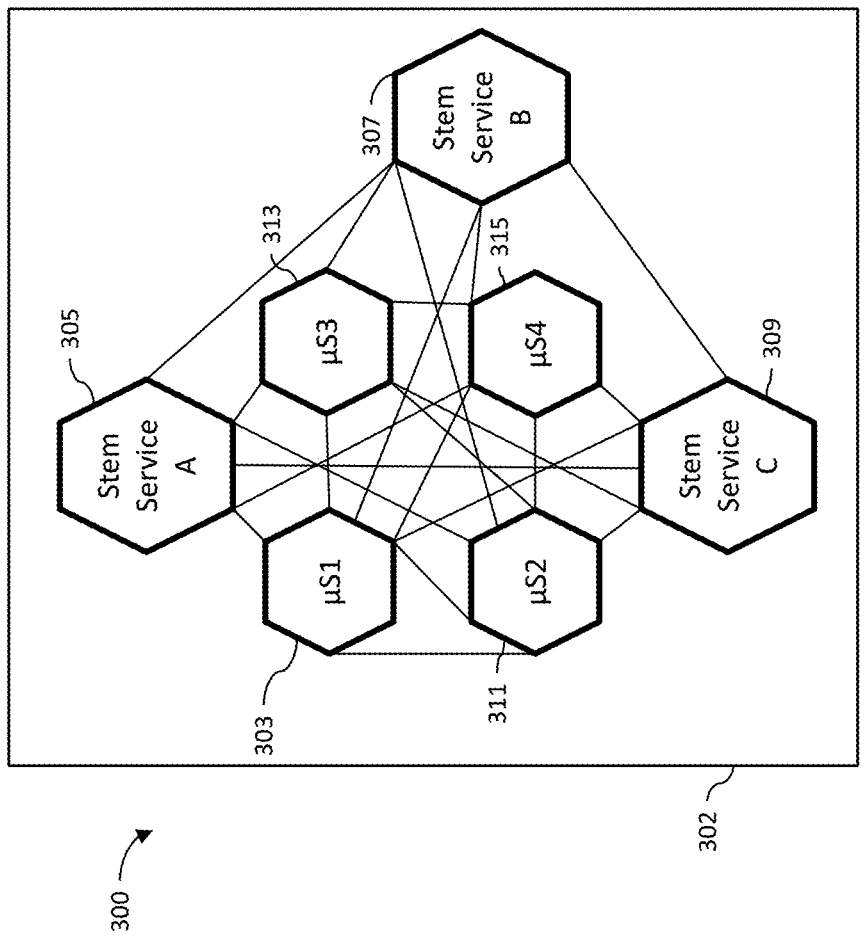
Figure 3C:
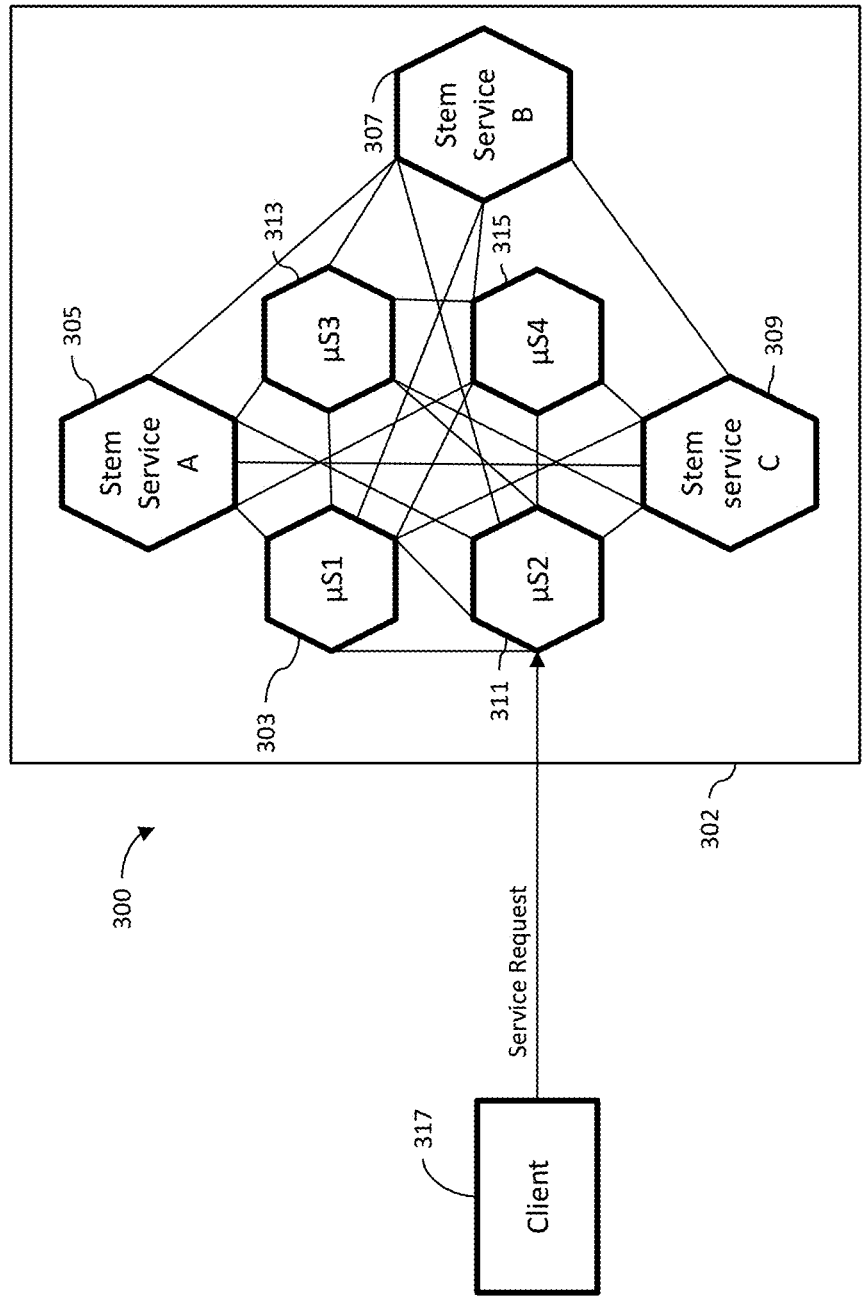

FIG. 3B illustrates a colony of microservices (μS1 303, μS2 311, μS3 313, and μS4 315) and stem services (Stem Service A 305, Stem Service B 307 and Stem Service C 309). Only four microservices and three stem services are shown but more are contemplated as part of this disclosure.

FIG. 3B illustrates what happens when a client 317 submits a service request to the server 301. The service request is routed to a stem service or a microservice (e.g. μS2 311) using pseudo-random routing. The microservice that receives the request (μS2 311) determines whether it can process the request. If the microservice(μS2 311) can process the request it will do so.

Figure 3D:
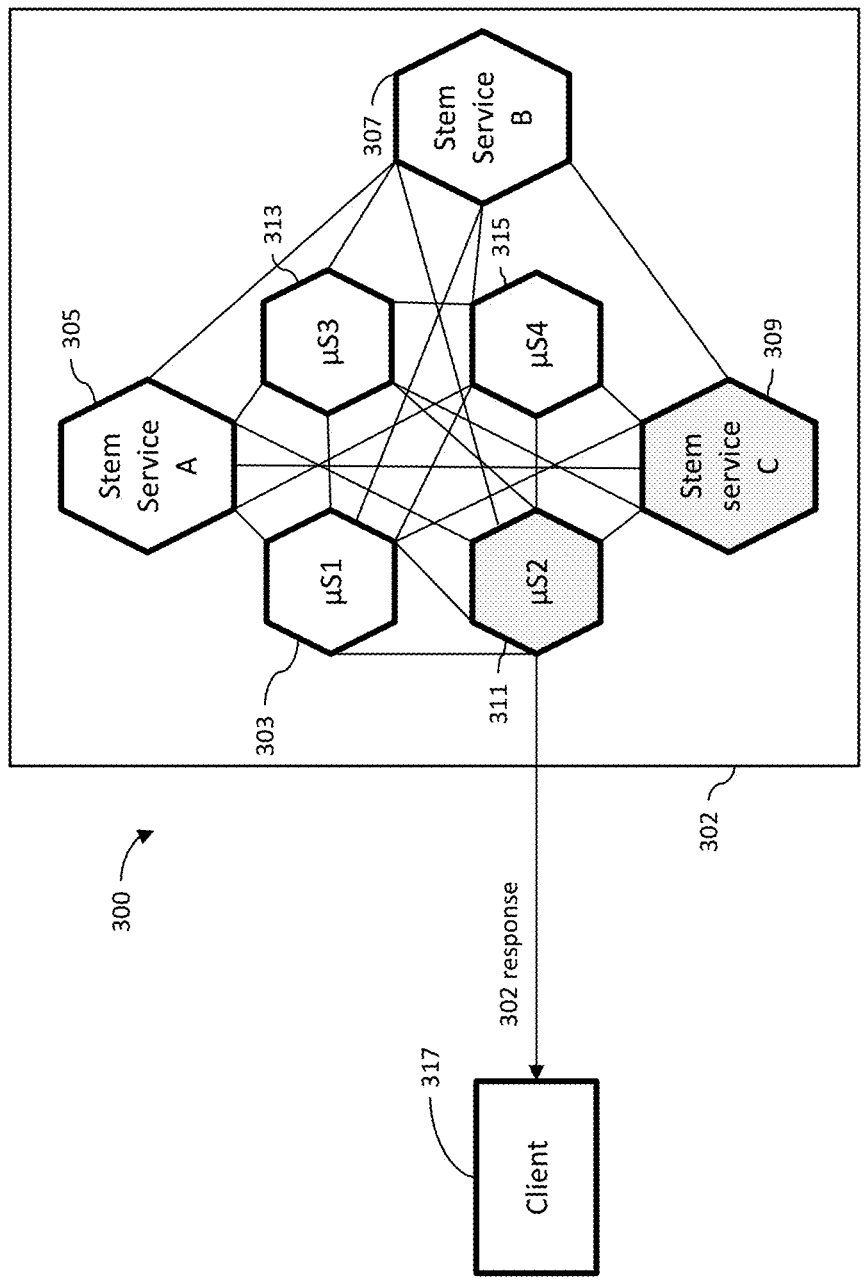

If the microservice μS2 311 cannot process the request, it will route the request to a stem service (e.g. Stem Service C 309 in FIG. 3D). The μS2 311 will send a 302 response back to the client 317 and obtain the URL for the stem service. The client then knows where to send the request because of the 302 response.

Figure 3E:
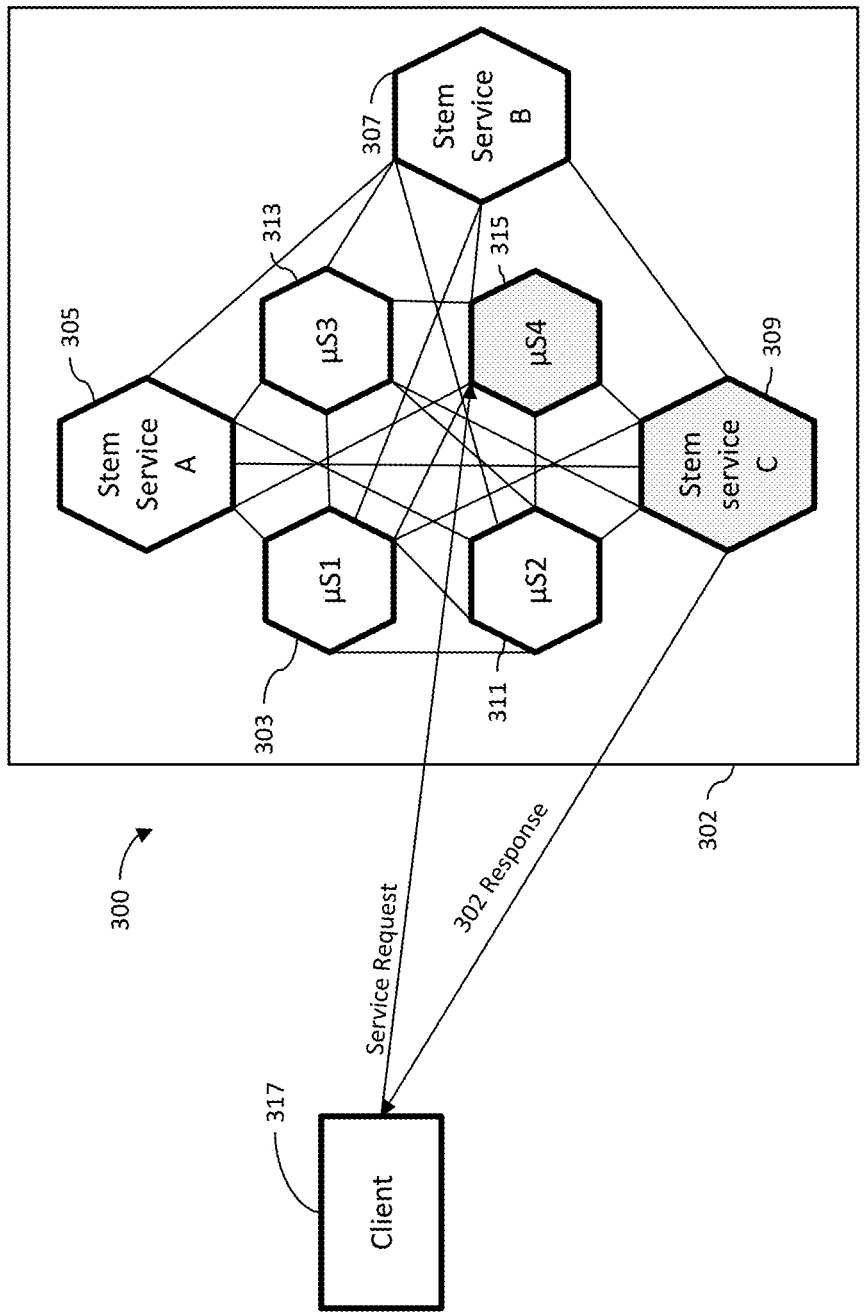
Figure 3F:
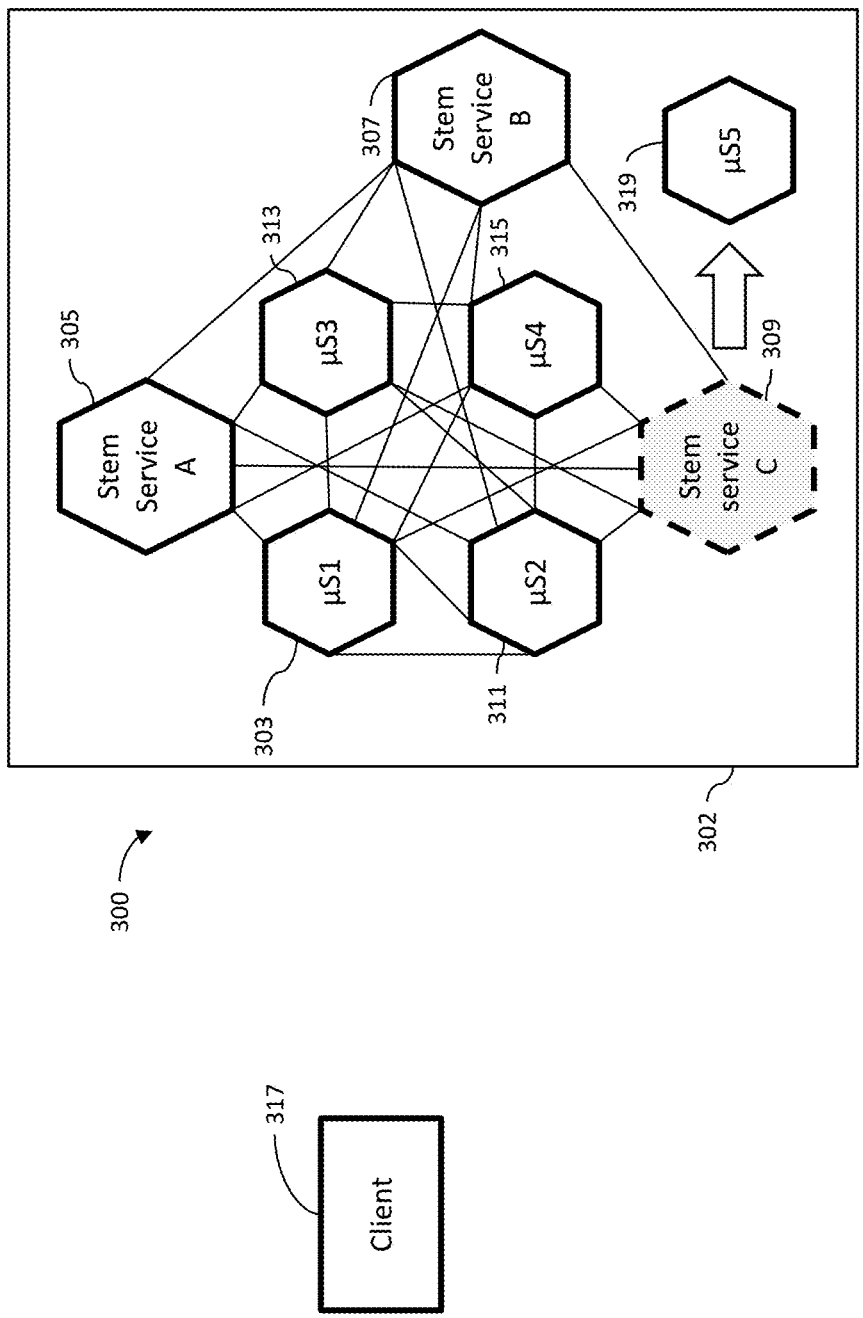
Figure 3G:
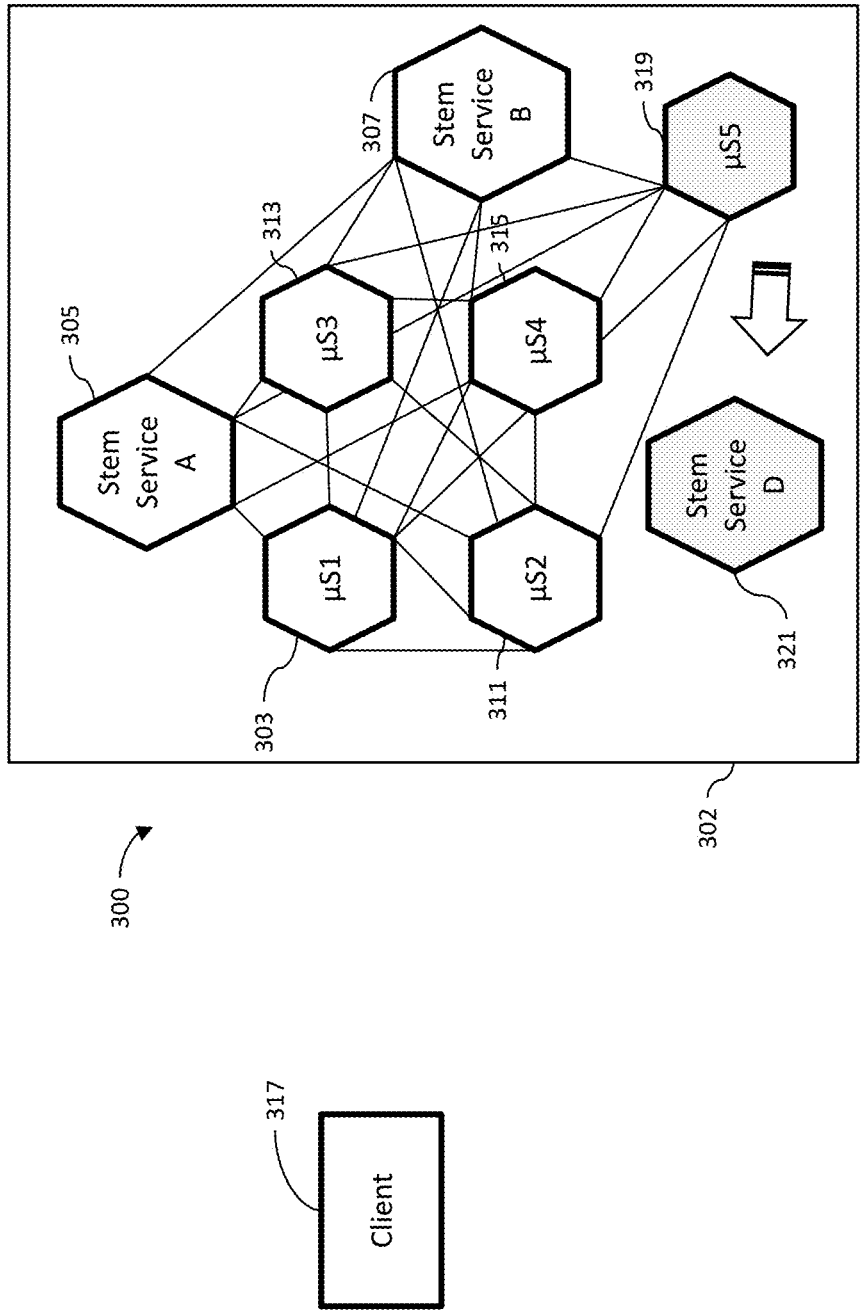

Upon receipt of the service request from the client, Stem Service C 309 will determine whether there is a micro service available in the colony that can process the service request. As shown in FIG. 3E if the Stem Service C 309 finds a micro service that can process the service request (e.g. μS4 315), it will send a 302 response to the client providing the address of the micro service that can process the request. The client then sends the request to μS4 315 which will service the request. The original micro service (μS2 311) is not involved in the lookup and transfer of the service request, rather that functionality is provided by the stem service.

As shown in FIG. 3 F, if the Stem Service C 309 does not find a micro service that can process the service request, then it will load the appropriate rules and morph into a micro service (μS5 319) with the business logic to process the service request. As soon as that happens the directory service will be updated. Then μS5 319 will determine the number of Stem Services in the colony. If the morphing of Stem service 309 results in fewer than the minimum number of stem services then μS5 319 will spin up a Stem Service (e.g. Stem Service D 321 in FIG. 3G.). If there are too many stem services in the colony the number will be reduced by a leader selection process so that access stem services are disabled. The number of Stem Services is self-regulating. The minimum number of stem services is a system setting decided by the network operator that establishes a minimum and maximum number of stem services to operate in the colony.

Figure 4:
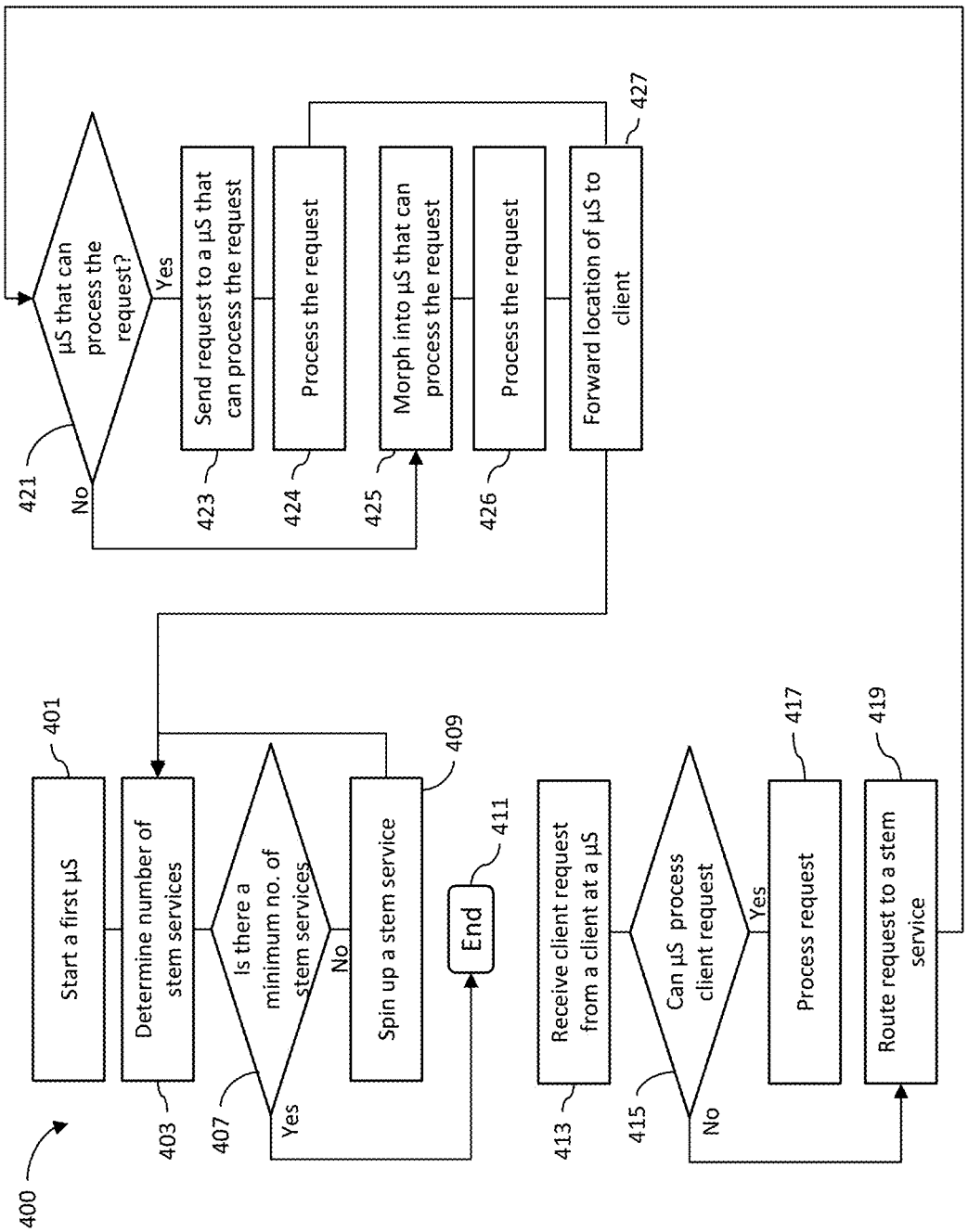
FIG. 4 is a flowchart of a method for a method for self-assembling and self-configuring micro services.

Illustrated in FIG. 4 is a flow chart of a method for self-assembling and self-configuring micro services 400.

In one embodiment of the method 400, in step 401 a network operator starts the first micro service.

In step 403 the method 400 determines the number of stem services in the colony. In step 407, the method 400 determines if there is a minimum number of stem services available.

In step 409, in the case where only one micro service has been initiated, there will not be any stem service available in the first micro service will spin up a first stem service. The method 400 will then repeat step 403 and 407 until it is determined that the minimum number of stem services are available.

In step 413 the method 400 a service request from the client is received at a micro service. In the case where there is only the first micro service available client request will be received at the first micro service. In the case where there is a plurality of microservices available, client request will be routed to any available micro service using pseudorandom forwarding.

In step 415 the method 400 determines whether the micro service that receives the service request can process the service request. If the micro service that received the service request can process the service request then the request is processed in step 417.

If the micro service that received the service request cannot process the service request then in step 419 the micro service will forward the service request to a stem service.

In step 421 to stem service that received the service requests determines whether there exists in the colony any micro service that can process the request.

If there is a micro service in the colony that can process the request and in step 423 the request will be sent to the micro service that can process the request and will be processed by that micro service in step 424.

If there is no micro service in the colony that can process the request then in step 425 the stem service will morph into a micro service that can process the request and then process the request in step 426.

After the request has been processed the location of the micro service is forwarded to the client in step 427.

The method 900 will once again determine whether the minimum number of stem services exist in the colony and if not will spin up an additional stem service.

The behavior of the system then, according to these protocols, at startup is as follows:
  a) "any" microservice (stem or non-stem) is started; this is the "seed"; as with any biological system, you need one seed/cell to start a colony.
  b) the "seed" (as with any microservice) checks for min number of stem-service, and since there aren't any it will spin up an(another) stem-service. In a sense it will start multiplying (as an embryo)
  c) the process will continue until sufficient stem-services are running.
  d) At any point during the previous processes, a client request could hit the system, and will be routed 'randomly' to any of the running microservice (stem or non-stem).

e) If the request lands on the wrong microservice (more than likely), it will be routed to a stem-service and then the stem-service will either route it to the correct microservice or will morph into that microservice.

Note that these are 301/302 type client redirects which means the client will automatically reroute the request and learn the location of the microservice for future requests; this way, this 'rerouting' only happens one time and thereafter only on changes (note that this is not necessary for the algorithm to work, but it makes it more efficient). The net result is that the 'colony' of μSs will dynamically replicate and around the demand (i.e. incoming requests) and therefore can more quickly shutdown unused services and focus on what is in demand "right now." This behavior also resembles biological systems by 'shedding' elements that are not in use (e.g. muscles, bone, etc.) and focus their energy on parts are in heavy use.

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method comprising:
   routing a service request to a first stem service of a plurality of stem services disposed in a system when a first micro service of a plurality of micro services disposed in the system cannot process the service request;
   determining whether there exists a second micro service of the plurality of micro services that can process the service request; and
   if there is no second micro service that can process the service request, morphing the first stem service into a micro service that can process the service request.

2. The method of claim 1, further comprising establishing a minimum number of stem services to be active in the system.

3. The method of claim 1, further comprising determining a number of stem services active in the system.

4. The method of claim 1, further comprising determining if a number of stem services active in the system is less than a minimum number of stem services to be active in the system.

5. The method of claim 1, further comprising spinning up a stem service if a number of stem services active in the system is less than a minimum number of stem services to be active in the system.

6. The method of claim 1, wherein each of the plurality of micro services comprises a client routing component, a micro service directory component, or a process instantiation and control component.

7. The method of claim 1, wherein the morphing the first stem service into the micro service that can process the service request comprises loading rules stored in the first stem service.

8. A system comprising:
   one or more processors; and
   memory coupled with the one or more processors, the memory storing executable instructions that when executed by the one or more processors cause the one or more processors to effectuate operations comprising:
   routing a service request to a first stem service of a plurality of stem services disposed in the system when a first micro service of a plurality of micro services disposed in the system cannot process the service request;
   determining whether there exists a second micro service of the plurality of micro services that can process the service request; and
   when there is no second micro service that can process the service request, morphing the first stem service into a micro service that can process the service request.

9. The system of claim 8, the operations further comprising establishing a minimum number of stem services to be active in the system.

10. The system of claim 8, the operations further comprising determining a number of stem services active in the system.

11. The system of claim 8, the operations further comprising determining if a number of stem services active in the system is less than a minimum number of stem services to be active in the system.

12. The system of claim 8, the operations further comprising spinning up a stem service if a number of stem services active in the system is less than a minimum number of stem services to be active in the system.

13. The system of claim 8, wherein each of the plurality of micro services comprises a client routing component, a micro service directory component, or a process instantiation and control component.

14. The system of claim 8, wherein the morphing the first stem service into the micro service that can process the service request comprises loading rules stored in the first stem service.

15. A non-transitory, computer-readable medium having computer-executable instructions stored thereon which, when executed by a computer, cause the computer to perform a method comprising:
- routing a service request to a first stem service of a plurality of stem services disposed in a system when a first micro service of a plurality of micro services disposed in the system cannot process the service request;
- determining whether there exists a second micro service of the plurality of micro services that can process the service request; and
- when there is no second micro service that can process the service request, morphing the first stem service into a micro service that can process the service request.

16. The non-transitory, computer-readable medium of claim 15, wherein the computer-executable instructions, when executed by the computer, cause the computer to perform a method further comprising establishing a minimum number of stem services to be active in the system.

17. The non-transitory, computer-readable medium of claim 15, wherein the computer-executable instructions, when executed by the computer, cause the computer to perform a method further comprising determining a number of stem services active in the system.

18. The non-transitory, computer-readable medium of claim 15, wherein the computer-executable instructions, when executed by the computer, cause the computer to perform a method further comprising determining if a number of stem services active in the system is less than a minimum number of stem services to be active in the system.

19. The non-transitory, computer-readable medium of claim 15, wherein the computer-executable instructions, when executed by the computer, cause the computer to perform a method further comprising spinning up a stem service if a number of stem services active in the system is less than a minimum number of stem services to be active in the system.

20. The non-transitory, computer-readable medium of claim 15, wherein the morphing the first stem service into the micro service that can process the service request comprises loading rules stored in the first stem service.

\* \* \* \* \*